(12) United States Patent
Johnson

(10) Patent No.: US 7,111,884 B2
(45) Date of Patent: Sep. 26, 2006

(54) TRUCK STORAGE AND WORK SURFACE TAILGATE

(75) Inventor: Daniel Sutton Johnson, Loveland, CO (US)

(73) Assignee: S.A. Robotics, Loveland, CO (US)

( * ) Notice: Subject to any disclaimer, the term of this patent is extended or adjusted under 35 U.S.C. 154(b) by 536 days.

(21) Appl. No.: 10/229,255

(22) Filed: Aug. 28, 2002

(65) Prior Publication Data

US 2004/0207226 A1    Oct. 21, 2004

(51) Int. Cl.
*B60P 1/32* (2006.01)

(52) U.S. Cl. .................. 296/26.1; 296/37.6; 414/462; 414/557

(58) Field of Classification Search ............. 296/26.01, 296/26.08, 26.09, 26.1, 37.1, 37.6; 224/402, 224/403, 404, 496, 504, 505, 507, 510; 414/462, 414/498, 499, 408, 409, 546, 547, 556, 557
See application file for complete search history.

(56) References Cited

U.S. PATENT DOCUMENTS

| | | | | |
|---|---|---|---|---|
| 2,982,431 A | * | 5/1961 | Moody | 414/462 |
| 3,305,112 A | * | 2/1967 | Brown | 414/557 |
| 3,406,999 A | * | 10/1968 | Kozicki | 296/156 |
| 3,637,097 A | * | 1/1972 | Horowitz | 414/557 |
| 3,700,123 A | * | 10/1972 | Corley, Jr. | 414/557 |
| 4,266,821 A | * | 5/1981 | Gillet | 296/37.6 |
| 4,787,809 A | * | 11/1988 | Zrostlik | 414/557 |
| 4,813,842 A | * | 3/1989 | Morton | 414/557 |
| 5,029,935 A | * | 7/1991 | Dufrancatel | 296/156 |
| 5,269,642 A | * | 12/1993 | Zoromski | 414/392 |
| 5,641,262 A | * | 6/1997 | Dunlop et al. | 414/557 |
| 5,827,037 A | * | 10/1998 | Wilson, Jr. | 414/556 |
| 5,964,492 A | * | 10/1999 | Lyon | 296/37.6 |
| 6,077,024 A | * | 6/2000 | Trueblood | 414/462 |
| 6,102,648 A | * | 8/2000 | Fretwell et al. | 414/540 |
| 6,206,627 B1 | * | 3/2001 | Winter et al. | 414/547 |
| 6,412,847 B1 | * | 7/2002 | De Gaillard | 296/26.02 |
| 6,416,272 B1 | * | 7/2002 | Suehiro et al. | 414/546 |
| 6,558,106 B1 | * | 5/2003 | Sardonico | 414/556 |
| 6,666,643 B1 | * | 12/2003 | Heynssens | 414/542 |
| 6,893,203 B1 | * | 5/2005 | Anderson et al. | 414/557 |
| 2001/0026756 A1 | * | 10/2001 | Mortimore | 414/556 |
| 2004/0105745 A1 | * | 6/2004 | Sandy | 414/557 |
| 2004/0228713 A1 | * | 11/2004 | Cohn et al. | 414/546 |

FOREIGN PATENT DOCUMENTS

JP            01022643 A  *  1/1989

* cited by examiner

*Primary Examiner*—Patricia L. Engle
(74) *Attorney, Agent, or Firm*—Holland & Hart

(57) ABSTRACT

A storage compartment and integrated tailgate worksurface is disclosed. The storage compartment is easily retrofitable to any standard or light duty pick-up truck bed. A parallel linkage mechanism and integrated power unit can raise and lower the storage compartment without rotation, thereby keeping objects in an initial desired orientation and placement within the compartment. The parallel linkage system also facilitates adjustment of the integrated tailgate work surface to convenient working heights.

18 Claims, 6 Drawing Sheets

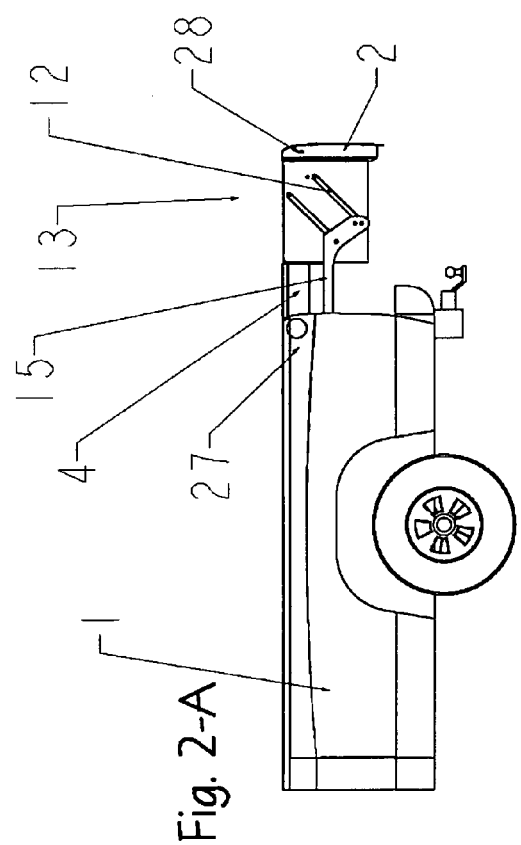
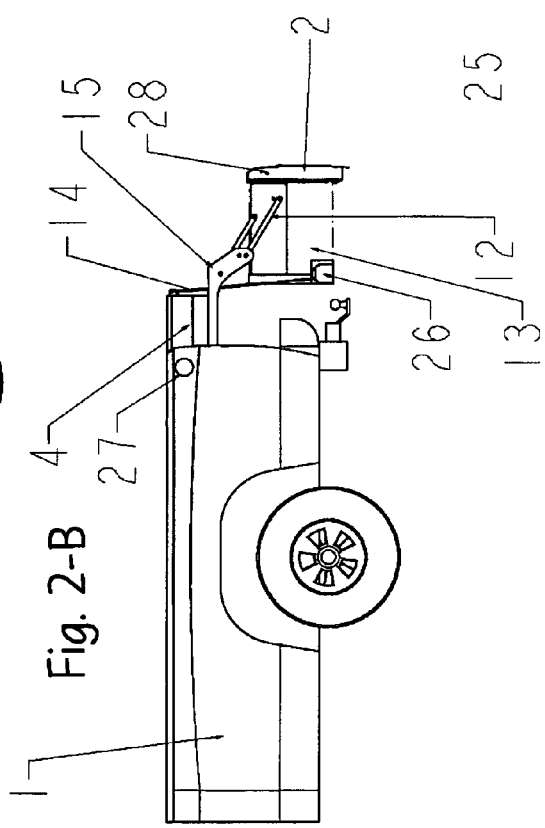

TRUCK STORAGE AND WORK SURFACE TAILGATE

BACKGROUND Of The INVENTION

1. Field of the Invention

The present invention relates to the automotive light truck accessory field primarily to accessories which enhance the practical utility of the truck for additional uses such as the storage and organization of tools and equipment, and the convenient assess and use of such tools and equipments, and transport of cargos particularly suited to such trucks.

2. Description of the Relevant Art

Pick-up type trucks are an essential tool for both transportation to and from job sites, and for tool and equipment storage and organization, and can also provide a convenient workplace to conduct job related task and activities. Most pick-up trucks in production today have uncovered beds to which is attached a hinged tailgate panel. This tailgate typically is hinged to allow the tailgate to fold flat with the plane of the truck bed in order to facilitate easy access for loading and unloading cargo. This horizontal surface can also serve as a convenient height work surface for assembling and working on a variety of objects in the field. Popular today also are truck storage containers, which either mount inside of the pickup truck bed, straddle across the bed width, or mount along the length of the bed. Usually these are of heavy-duty construction, and are accessible by standing inside of the bed, or alongside of the truck. There are numerous practical disadvantages to their use, since open easy access is usually not possible due to the increasing height of the trucks today, the accessibility of objects and tools placed at the bottom or the center of these containers is impossible unless one climbs onto the bed of the pickup and bends over . . . tasks which are inconvenient and which are susceptible to worker injury. Also, unlocking and opening the covers to these cargo boxes can be made difficult by their height and inconvenient location Another disadvantage of units presently available is their incursion and use of cargo volumetric space, limiting the useful load carrying space available, such as carrying 4 ft by 8 ft plywood sheets, large building materials, etc. Additionally, the design aspects of currently available tool storage boxes do not integrate into the vehicle's design appearance, and often detract from the vehicle appearance. Accordingly, these prior approaches have failed to meet many of the needs of pickup truck owners.

SUMMARY OF THE PRESENT INVENTION

The present invention provides for easy and convenient tool and cargo storage, which can be easily retrofitted together with or in lieu of a standard pickup truck tailgate. It provides for the convenient access to tools and other items at any desired working height. It also can serve as a work-surface level with the existing pickup bed height, and will allow for easy loading and sliding of cargo load from the lowered tailgate surface into the pickup bed. The invention is self-powered from within, requiring only existing electrical connections from the pickup truck to implement it's raising and lowering function. The invention allows for full usage of the original cargo volume, and provides for normal unrestricted access to the cargo for easy loading and unloading. The invention can also match the existing styling scheme of the pickup truck to which it is attached, and can have provision mounting of the original equipment tailgate assembly to preserve the vehicles original design intent.

A more specific design of this truck cargo storage and work surface tailgate invention is described at length and depicted in the diagrams.

The truck cargo storage and work surface tailgate in accordance with principles of the present invention comprises a box like cargo container assembly slidably mounted so as to fit into the rear portion of the cargo area of a pickup type truck bed. This assembly has and external rear directed face to which is attached the standard production issue tailgate, which maintains the styling and contours of the original vehicle design. The volumetric usable cargo spaces defined by the interior cargo box dimensions occupy some fraction of the interior space of the rear pickup bed area when the invention is in the raised, normal condition. By use of a sliding extensible carrier, the original bed length and volumetric dimensions of the truck can be maintained. However, instead accessing the pickup bed by a unlatching mechanism of a hinged stock tailgate assembly, the present invention utilizes and electric powered winch or hydraulic actuator assembly to effect a non-rotational translation vis-à-vis a parallel linkage mechanism to translate and lower the tailgate and cargo container assembly to a much lowered position. Accordingly, with the cargo box container in a lowered position, a top lid of the cargo box may be at the same height of the pickup bed, providing convenient and easy access to the cargo box. The user can also raise and lower the attached original issue tailgate component as usual, thus providing a convenient work surface and lifting device. A useful provision for the sliding extension when the invention is in the raised position is to maintain the original truck cargo area volume and dimensions, thus allowing transport of large plywood sheets, building materials, etc, as the truck was originally intended. Closure of the cargo box container lid while in the lowered position also allows the lid surface to be used as a work surface for such tasks as mounting or using tools, positioning objects to be worked upon, or for sliding large cargo to and from the rest of the pickup truck bed. Another useful provision is the incorporation of a lift gate feature which can raise loads from ground level to the height of the pickup bed by means of a simply opening the standard issue tailgate component, thus effecting a powered lift gate.

BRIEF DESCRIPTION OF THE DRAWINGS

The present invention will be more fully understood by reference to the following detailed description of the preferred embodiments of the present invention when read in conjunction with the accompanying drawings, in which like reference characters refer to like parts throughout the views, and in which:

FIG. 2A is a side view showing the raised and extended position according to one embodiment of the present invention.

FIG. 2B is a side view showing the cargo box assembly extended and lowered according to one embodiment of the present invention.

DETAILED DESCRIPTION OF THE PREFERRED EMBODIMENT OF THE PRESENT INVENTION

The drawings describe the preferred embodiment of the present invention. While the configurations according to the illustrated embodiments are preferred, it is envisioned that alternative configurations of the present invention may be adopted without deviating from the invention as portrayed. The preferred embodiment is discussed herafter.

Figure 1:
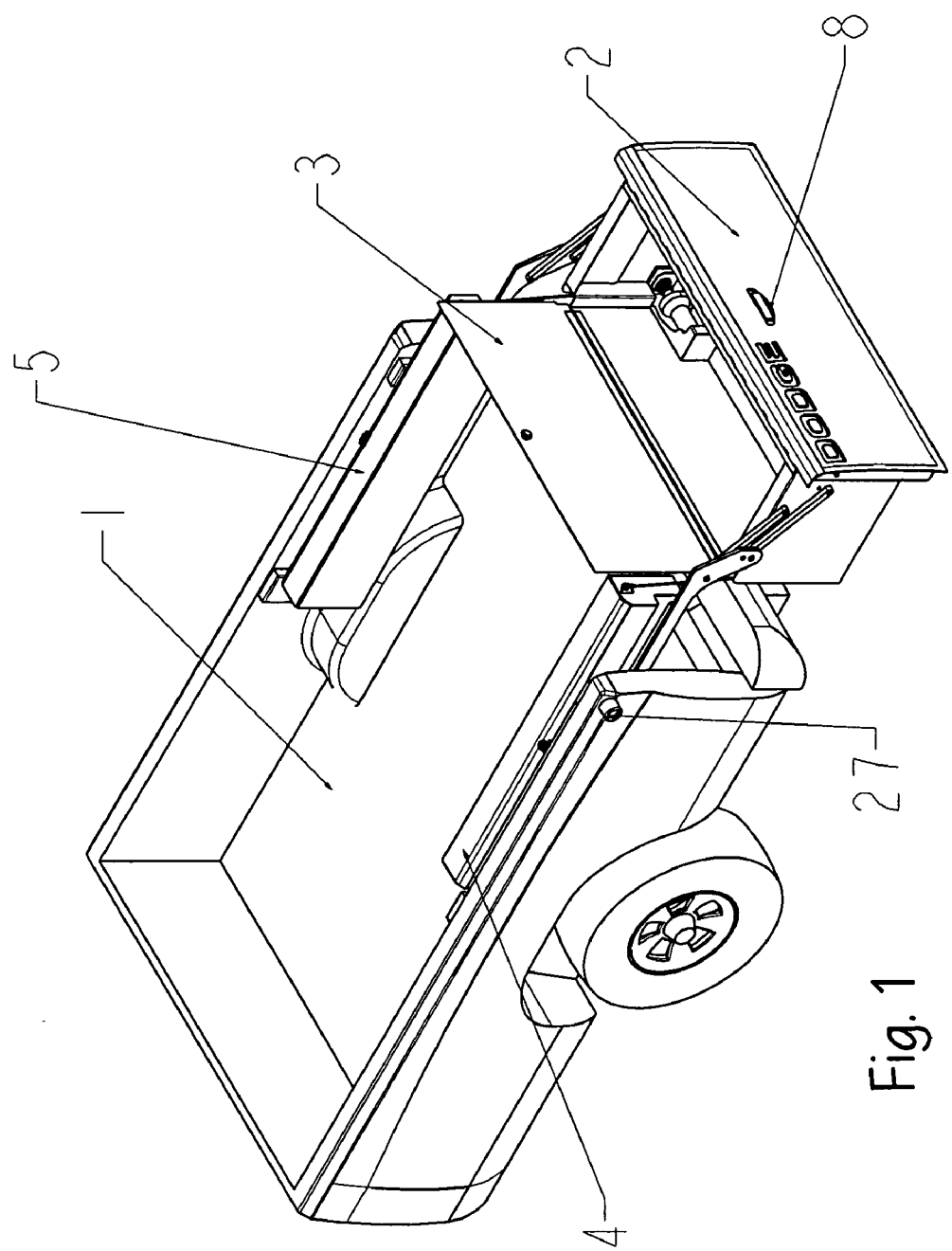
FIG. 1 is a perspective view of a cargo box assembly in the fully retracted and closed position according to one embodiment of the present invention.
Figure 3:
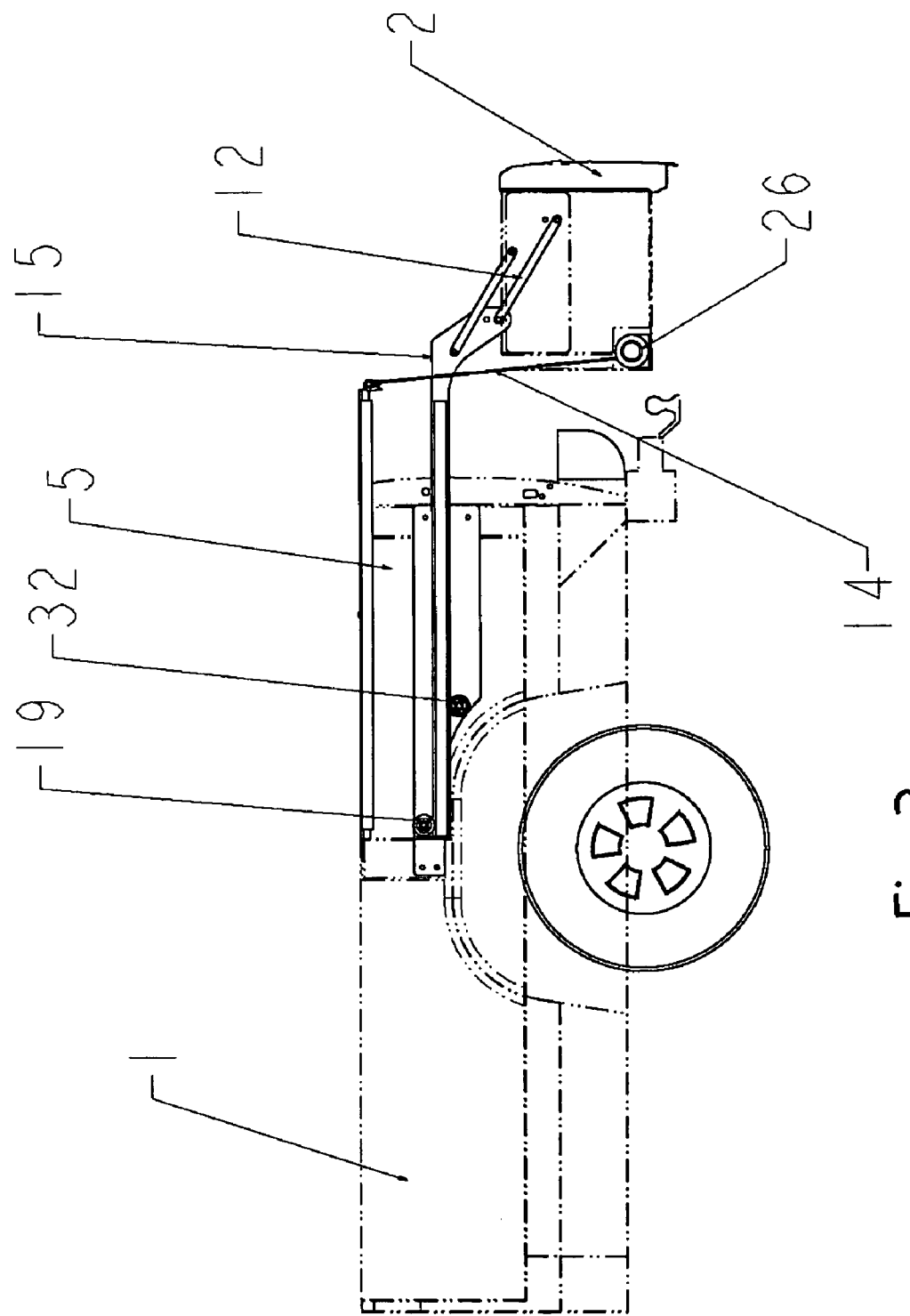
FIG. 3 is a cut-away view of the cargo box of FIG. 1, revealing the actuation and powered mechanisms according to one embodiment of the present invention.

Referring to FIG. 1, shown is the conventional appearance of one embodiment of the present invention when fully retracted and closed in a first position. Truck bed 1, and truck lift gate 2, are standard issue and remain the same as original vehicle issue, with bolted right slide 5 and left slide 4 attached to the truck bed sides as shown. Likewise, referring to FIG. 2-A, is shown a side view of a cargo or truck tailgate storage box structure 13 in a raised, extended position according to one embodiment of the present invention.

Figure 4:
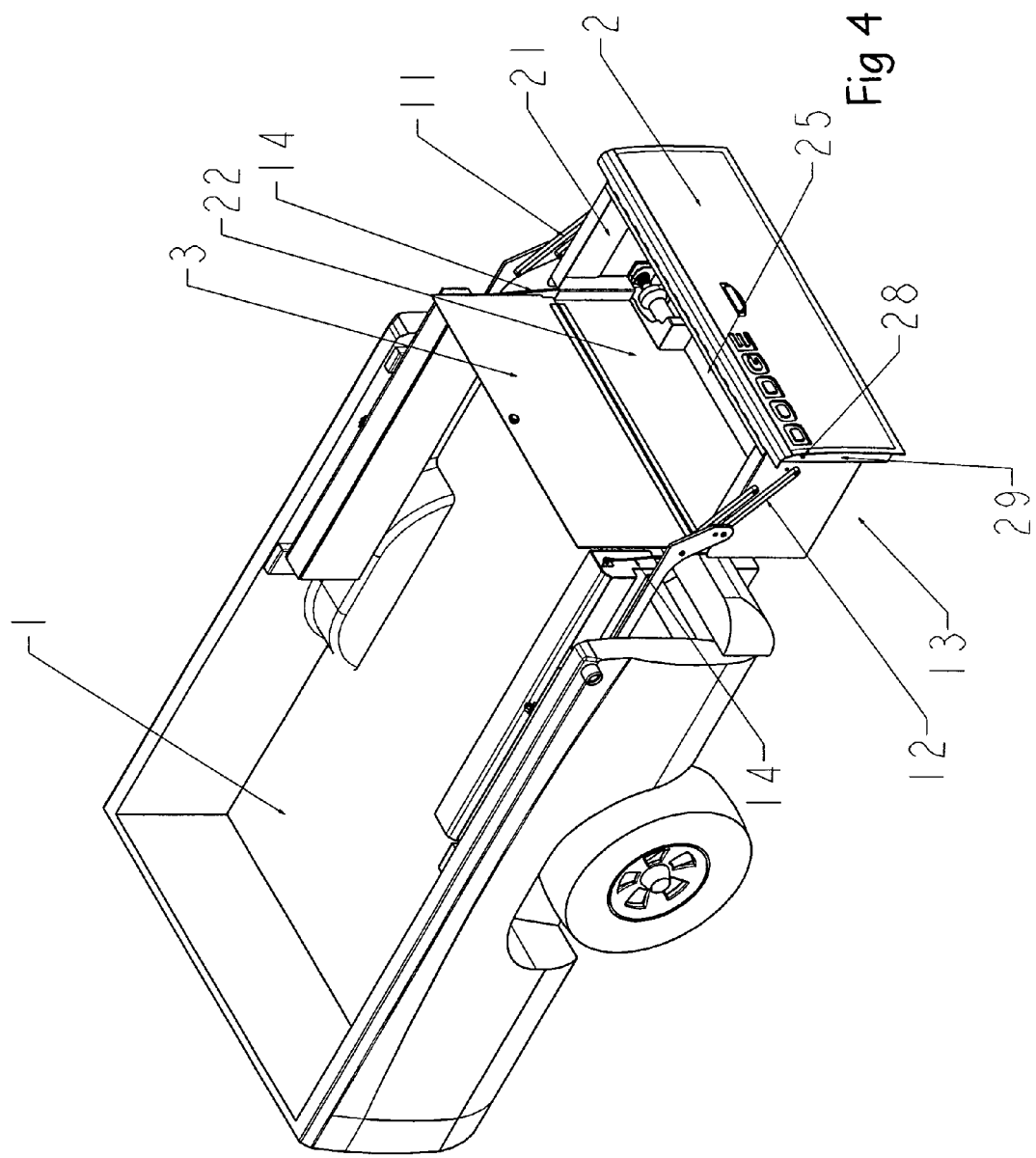
FIG. 4 is a perspective view showing the features of the cargo box assembly according to one embodiment of the present invention.

Referring to FIG. 2-A, the truck tailgate storage box structure 13 is shown in the up position. FIG. 2-B illustrates the truck tailgate storage box structure 13 in an extended down or second position. Storage box structure 13 can be of generally rectangular construction of heavy gage steel or aluminum, and welded or assembled by conventional bolts and screws to form a box like container having at least four planar surfaces having at least three sides and a bottom. Shown in FIG. 4 are the essential sides 20, 21 and 22 of box structure 13, and bottom 25. Attached to the face 29 of the box structure 13 is the stock issue truck tailgate assembly 2. Latching pins 28, as shown in FIG. 2-B, allow the tailgate assembly 2 to latch and release by use of the standard tailgate release handle 8 shown in FIG. 1.

Figure 5:
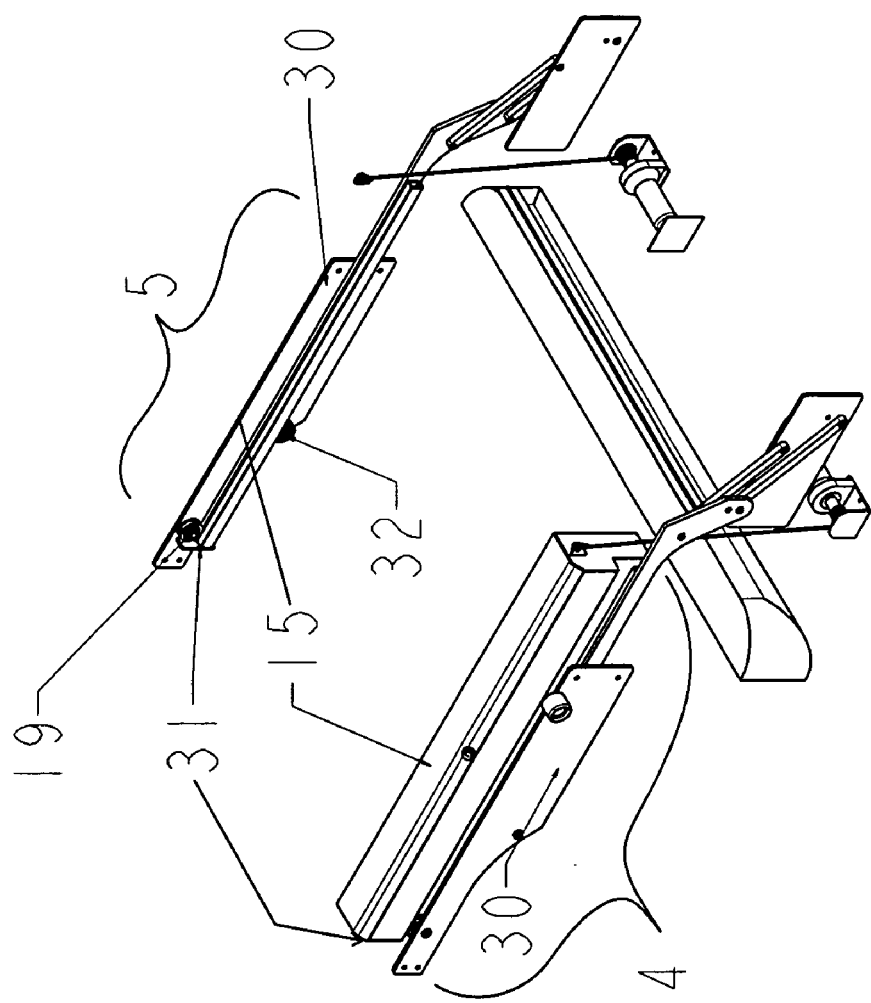
FIG. 5 is a perspective view of a bed mounted extensible slide assembly according to one embodiment of the present invention.
Figure 6:
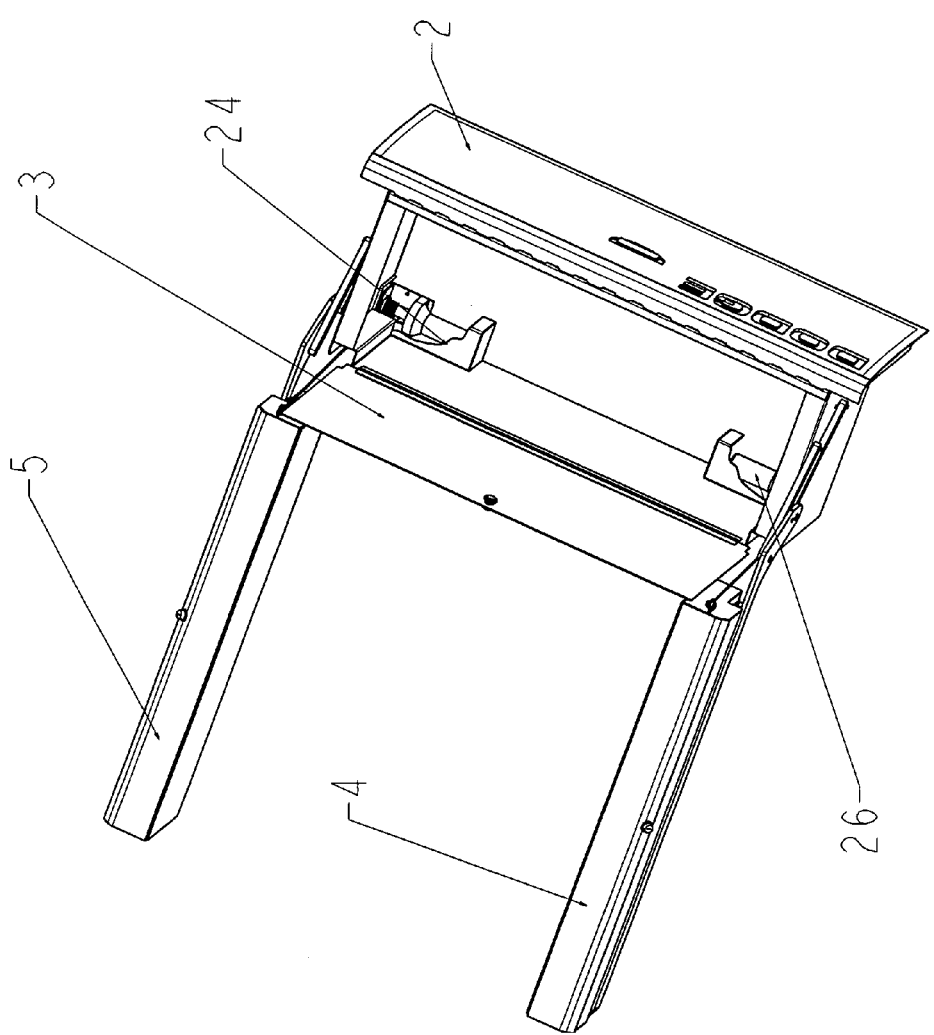
FIG. 6 is a top perspective view showing constituent elements according to one embodiment of the present invention.

Referring to FIG. 5, the sliding rail assemblies 4–5 are each comprised of a base support plate 30, which is bolted or otherwise attached to the truck bed sidewalls shown in the other figures (portions of right assembly 5 removed for clarity). Two roller bearings 19 and 32 are fixedly attached to support plate 30, with a fixed predefined horizontal spacing, so as to allow sliding rail 15 to linearly translate between a fully extended position shown in FIG. 2-A, and fully retracted position as shown in FIG. 1. Hard stop tab 31, as shown in FIG. 5, is attached or welded to rail 15, and thus prevents the sliding rail 15 from overextending when the toolbox assembly is in the fully extended position as shown in FIGS. 2-A–2-B. The right pickup bed rail assembly 5 as shown in FIG. 6 is a mirrored functional equivalent to the left pickup bed rail assembly 4.

Referring to FIGS. 2-A, 2-B, 4, and 6, it can be seen that the raising and lowering of storage box structure 13 is effected by a parallel linkage mechanism comprised of a pair of right side and left side links 11 and 12. Cables 14 are fixedly attached to rail assemblies 4 and 5, and terminate onto electric winch assemblies 24, 26, located approximately rearwardly centered on storage box structure bottom 25. Thus, to raise and lower the storage box structure 13 and attached tailgate assembly 2, a powered switch 27 located at some convenient position, is switched between a raised or lowered position setting. Toggling the powered switch 27 activates the winches 26 and/or 24 in a chosen direction, to in effect lengthen or shorten the cables 14. The parallel linkage mechanisms 11 and 12 only allow for horizontal and vertical translation, without substantially effecting the rotation of storage box storage box structure 13 (e.g. curvilinear translation). Thus, the contents of storage box structure 13 are not disturbed from their organized position. Power for winches 24, 26 (FIG. 6) and associated circuitry may be obtained from connection to the vehicle electrical system, or by use of a small optional battery located within the storage box structure 13. Storage box structure lid 3, as shown in FIG. 6, is hinged and can be lockable, allowing access to the contents of storage box structure 13 when it is in any orientation, either raised or lowered, or retracted or extended. Likewise, truck tailgate 2 can be likewise raised or lowered in any of the allowable orientations of storage box structure 13, either raised or lowered, or retracted or extended. This feature allows the tailgate to still be used as an adjustable height worksurface when in the folded down position. Also, by incorporating suitable locking features into the inventions slide mechanisms, the invention can be locked into the raised, extended position of FIG. 2-A, allowing for a full pickup bed cargo volume to be loaded, transported, and unloaded easily.

Thus there has been described an invention which allows for the convenient access and use of a truck storage cargo container and work surface tailgate. Such and invention is not limited to a particular style, model, or vintage of a truck, as minor modifications to dimensions only will accommodate a wide variety of available trucks. Having described my invention, many modifications will become apparent to those skilled in the art to which it pertains without deviation from the spirit of the invention as defined by the scope of the appended claims

I claim:

1. A vehicle apparatus, comprising:
   a sliding rail assembly mountable to a vehicle;
   a linkage mechanism attached to the sliding rail assembly;
   a cargo box attached to the linkage mechanism, one side of the cargo box comprising a truck tailgate;
   wherein the linkage mechanism is capable of curvilinearly translating the cargo box from an elevated first position to a lowered second position.

2. The vehicle apparatus according to claim 1, wherein the linkage mechanism comprises a parallel linkage mechanism, wherein the parallel linkage mechanism comprises two links that are always parallel to one another.

3. The vehicle apparatus according to claim 2, wherein the parallel linkage mechanism is operated by a cable attached to a winch.

4. The vehicle apparatus according to claim 1, wherein the sliding rail assembly comprises a right assembly and a left assembly, each of the right and left assemblies comprising two roller bearings fixedly attached to a support plate, the right and left assemblies being capable of supporting the cargo box in a fully cantilevered position.

5. The vehicle apparatus according to claim 1, wherein the cargo box comprises a lockable top lid.

6. The vehicle apparatus according to claim 1, wherein the cargo box is sized less than one half of a standard pick-up bed volume.

7. The vehicle apparatus according to claim 1, wherein the cargo box is received in a pick-up bed in the elevated first position and adjacent to a ground surface in the lowered second position.

8. A vehicle apparatus, comprising:
a vehicle bed having a tailgate;
a cargo box attached to the tailgate and extending partially into the vehicle bed;
first and second sliding rail assemblies mounted in the vehicle bed;
a first linkage mechanism attached to the first sliding rail assembly and a second linkage mechanism attached to the second sliding rail assembly;
wherein the first and second sliding rail assemblies and first and second linkage mechanisms cooperate to non-rotationally translate the cargo box and tailgate from the vehicle bed to a ground position.

9. The vehicle apparatus according to claim 8, wherein the cargo box comprises a lockable top lid.

10. The vehicle apparatus according to claim 8, wherein the first and second linkage mechanisms comprise parallel linkage mechanisms, the parallel linkage mechanisms comprising two links that are always parallel to one another and operable by a cable winch.

11. The vehicle apparatus according to claim 10, wherein the cable winch is arranged inside the cargo box.

12. The vehicle apparatus according to claim 8, wherein the attachment between the cargo box and the tailgate comprises a hinge.

13. The vehicle apparatus according to claim 8, wherein in the vehicle bed comprises a pick-up truck bed.

14. A method of moving a vehicle cargo box, comprising:
horizontally translating the vehicle cargo box from a bed to a cantilevered position extending from the bed;
curvilinearly translating the vehicle cargo box from the cantilevered position to a lower elevation;
wherein one side of the cargo box is a truck tailgate.

15. The method according to claim 14, wherein the horizontally translating comprises rolling a pair of side rails connected to the cargo box along roller bearings, and wherein the curvilinearly translating comprises rotating a pair of parallel linkage systems with a pair of winches.

16. A vehicle cargo box movement cycle, comprising:
extending a cargo box and tailgate from a vehicle bed with a powered sliding rail assembly;
lowering the cargo box without rotation of the cargo box with a powered linkage mechanism;
lifting the cargo box without rotation of the cargo box with the powered linkage mechanism;
retracting the cargo box into the vehicle bed with the powered sliding rail assembly.

17. The vehicle cargo box movement cycle according to claim 16, further comprising opening a cargo box lid of the cargo box.

18. A method of loading a vehicle bed, comprising:
providing a powered movable cargo box in the vehicle bed;
horizontally translating the cargo box from the vehicle bed to a cantilevered position such that there is elevational spacing between the cargo box and the vehicle bed;
sliding cargo under the cargo box and into the vehicle bed.

* * * * *